June 17, 1924.
E. A. GEISLER
FLEXIBLE PLANTER FRAME
Filed March 11, 1922
1,497,781
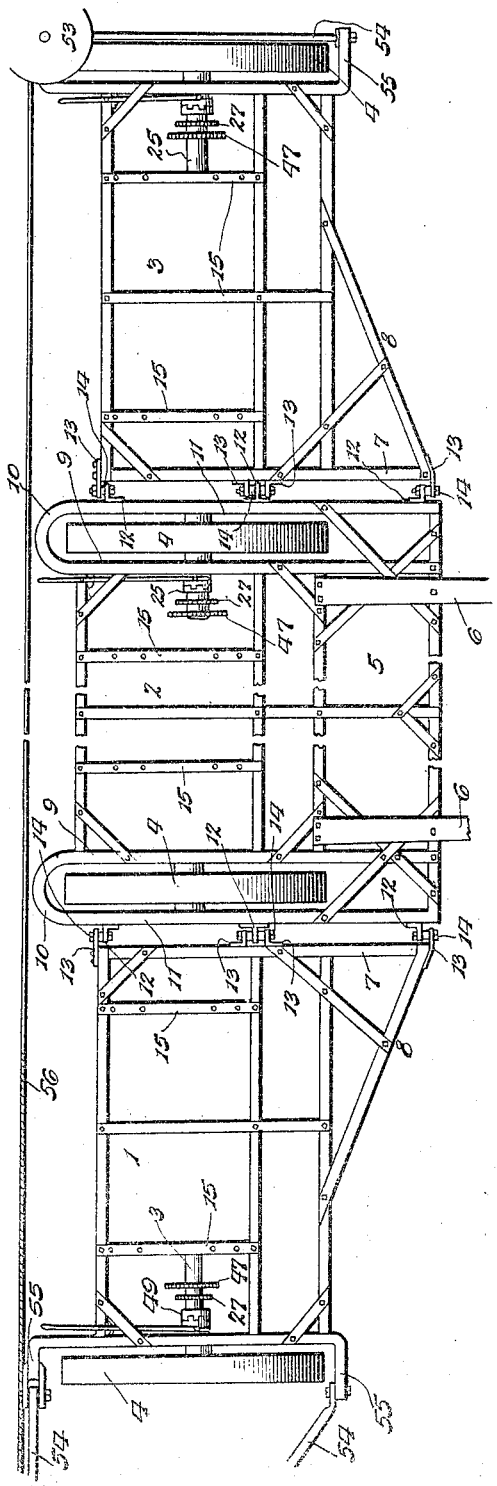
Inventor
E. A. Geisler.

Patented June 17, 1924.

1,497,781

UNITED STATES PATENT OFFICE.

EDWARD A. GEISLER, OF DOWNS, KANSAS.

FLEXIBLE PLANTER FRAME.

Application filed March 11, 1922. Serial No. 542,963.

*To all whom it may concern:*

Be it known that I, EDWARD A. GEISLER, a citizen of the United States, residing at Downs, in the county of Osborne and State of Kansas, have invented certain new and useful Improvements in Flexible Planter Frames, of which the following is a specification.

This invention relates to agricultural machines and has for its object the provision of a machine which will plant over a wide path and will readily adapt itself to inequalities in the surface of the field. Further objects of the invention will appear in the course of the following description, and the invention resides in certain novel features which will be particularly pointed out in the claims following the description.

The accompanying drawing is a plan view, partly broken away, of a planter frame embodying my improvements.

In carrying out my invention, I employ a frame consisting of three sections 1, 2, 3, arranged side by side and supported by ground wheels 4. The central section, 2, is extended forwardly to provide a draft frame 5 to which draft tongues 6 may be secured, and the inner end bars 7 of the end sections 1 and 3 are likewise extended forwardly, rigidity of the extensions being attained by braces 8. The ground wheels 4 are carried by stub axles mounted in suitable bearings provided at the ends of the frame section 2 and at the outer ends of the sections 1 and 3. The end members 9 of the central section 2 are projected slightly rearward and are connected by a bend 10 with similar parallel members 11 whereby horizontally disposed U-shaped wheel guards and supports are produced. On the outer side of each frame member or beam 11, I secure lugs or brackets 12 and on the opposed side of the adjacent end bars 7 I secure mating lugs or brackets 13, and pivot bolts 14 are fitted in said brackets. The inner ends of the outer sections are thus supported by the ends of the intermediate section and the pivotal or hinged connection between the sections permits relative movement of all the sections in a vertical plane so that, while the machine will cover a wide area during each trip, the several sections may readily conform to the irregularities in the surface so that the furrow openers and seed spouts will not be injured through being caused to dig into the surface of the ground. It will be readily noted that the foremost pivotal connections between the frame sections are located at the extreme front thereof so that the draft frame and the braces connected thereto will also have relative vertical movement and will follow the oscillations of the several sections of the planter.

Each section of the main frame comprises a plurality of longitudinal beams 15 upon which may be secured brackets designed to support a hopper or seed boxes 20 when large seeds as to be planted. The axles 25 are equipped with sprockets 27 and 47 adapted to be connected with suitable seed agitating and feeding devices. The sprockets 27 and 47 are loose upon the axle but are connected by a common hub and the sprocket 27 is constructed with a clutch hub 49 adapted to cooperate with a clutch sleeve keyed upon the axle. A suitable lever is provided to disengage the clutch members when adjusting the machine.

To the outer ends of each end frame, I connect markers 53 so that, as the machine is drawn over a field, a line will be drawn defining the path to be followed upon the return trip. Each marker is carried at the outer end of a marker frame 54 which consists of two outwardly converging bars joined at their outer ends to carry the marker disk and having their inner ends pivotally attached to the outwardly projecting supporting arms 55 on the end frame sections which are located in front and in rear of the wheels 4 on the respective sections. A cable 56 is secured to and extends between the two markers so that as one marker is lowered to operative position the other marker will be raised and will be held in a vertical position over the frame by the weight of the working marker.

Having thus described the invention, what is claimed as new is:

1. A planter comprising end frames, an intermediate frame, a ground wheel at the outer end of each end frame, ground wheels at both ends of the intermediate frame, between the same and the inner ends of the end frames, wheel guards at the ends of the intermediate frame, said wheel guards being disposed in the plane of the intermediate frame and spanning the wheels in rear of the same, hinge connections between the outer sides of said wheel guards and the ends of the end frames, and means on the several frames driven by the respective ground wheels for discharging seed.

2. A planter comprising end frames, an intermediate frame alined transversely with the end frames, hinged connections between the ends of the intermediate frame and inner ends of both end frames, draft frame extensions on the front sides of all the frames, hinged connections between the draft frame extensions alined with the hinged connections between the end and intermediate frames, ground wheels at the outer ends of the end frames, ground wheels at both ends of the intermediate frame, and wheel guards formed in the ends of the intermediate frame at the inner sides of the hinged connections between the frames, said wheel guards lying in the plane of the intermediate frame and being U-shaped to span the rear portions of the wheels.

In testimony whereof I affix my signature.

EDWARD A. GEISLER. [L. S.]